Patented Sept. 5, 1939

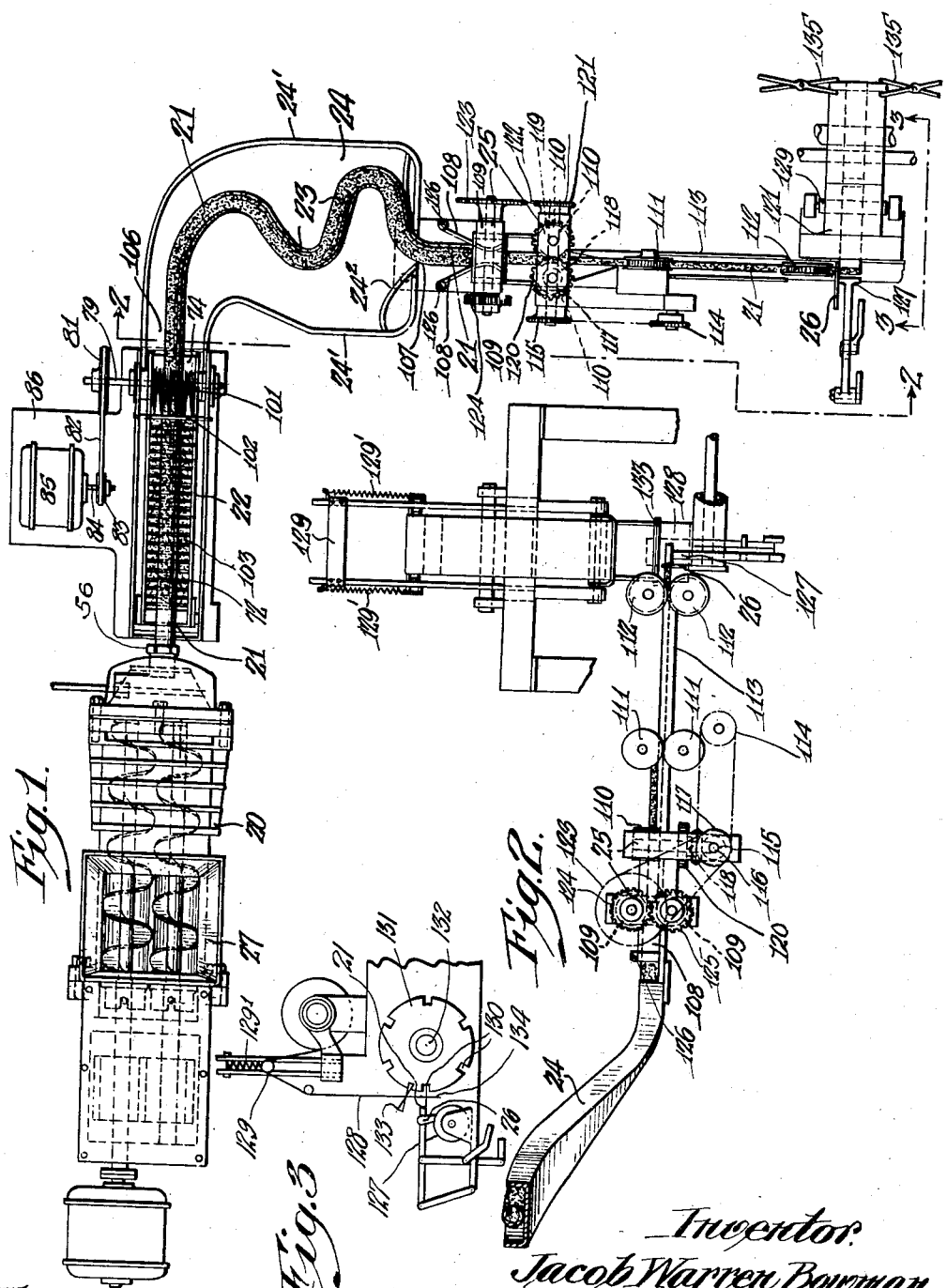

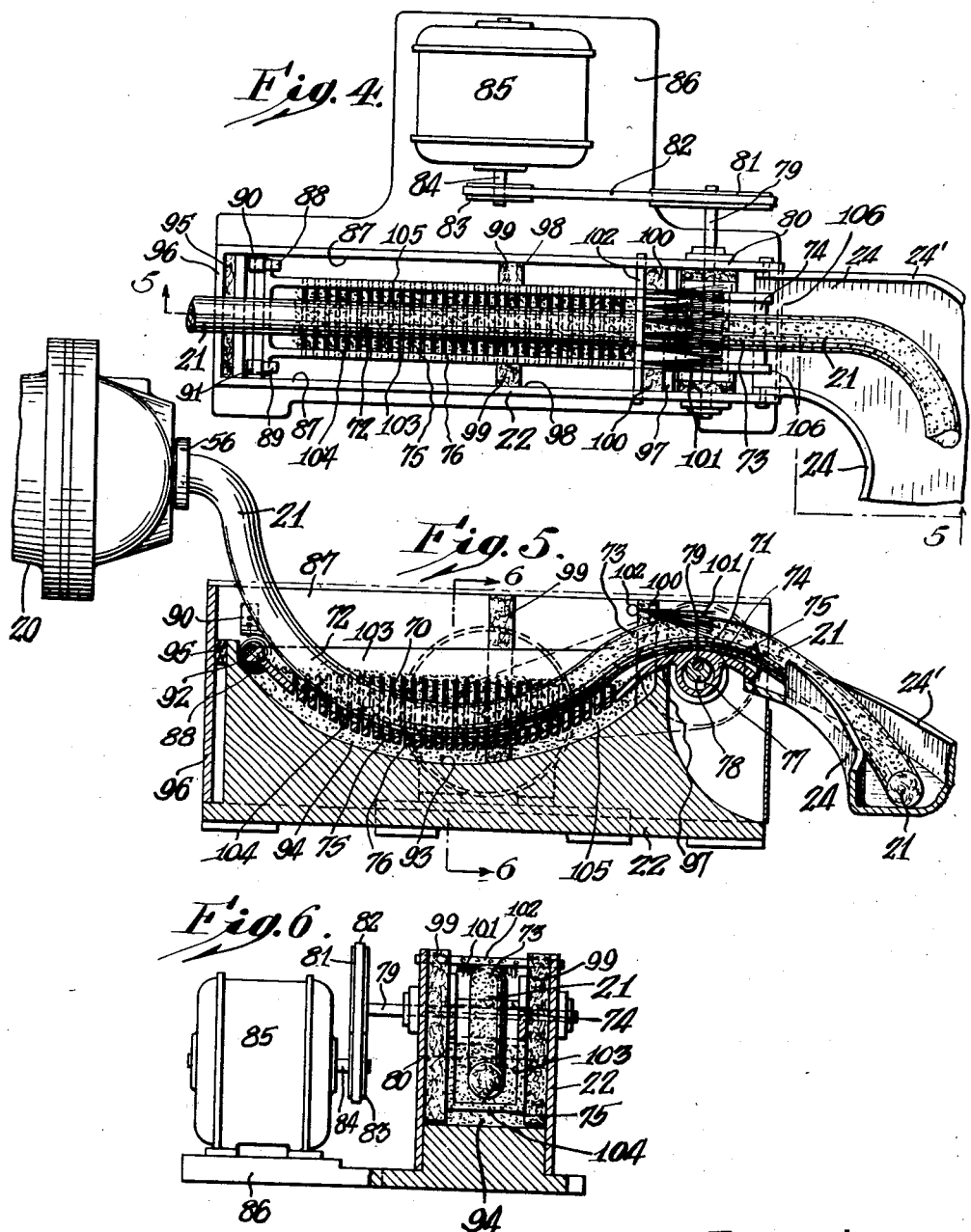

2,171,960

UNITED STATES PATENT OFFICE 2,171,960

APPARATUS FOR HANDLING CHEWING GUM

Jacob Warren Bowman, Philadelphia, Pa., assignor, by mesne assignments, to William Steell Jackson and Son, a firm comprising William Steell Jackson and Joseph Gray Jackson, Philadelphia, Pa.

Original application April 7, 1934, Serial No. 719,450. Divided and this application January 18, 1935, Serial No. 2,334. Renewed December 22, 1938

6 Claims. (Cl. 91—4)

My invention relates to apparatus for placing a coating of sugar on a strand of chewing gum.

A purpose of the invention is to provide an agitator for coating a strand of chewing gum with sugar and at the same time moving the strand longitudinally.

This application is a division of an application filed by me April 7, 1934, Serial No. 719,450, for Methods and apparatus for handling chewing gum.

I believe I am the first to place gum dough in a mixing or kneading machine and to cause a strand of gum to be passed continuously from the mixing machine through a nozzle, with an electric heating element about the nozzle to heat the nozzle and thereby cause a free and easy passage of the gum through the nozzle, after which the strand of gum is passed through a sugaring device where the gum is coated with sugar on an agitated platform and at the same time moved longitudinally forward to a platform upon which the strand assumes a snake or serpentine formation.

The strand is then moved forward to re-shaping rollers adjacent a wrapping machine and from the re-shaping rollers to the wrapping machine proper where the strand is cut into individual pieces.

I will now describe my invention more in detail, referring to the drawings, which are intended to be merely illustrative of one desirable embodiment of the invention.

Figure 1 is a top plan view of mechanism which may be employed in handling chewing gum and employing my sugaring means.

Figure 2 is a transverse sectional view of a portion of Figure 1 taken on the line 2—2 thereof.

Figure 3 is a fragmentary elevational view of a portion of Figure 1 taken on the line 3—3 thereof.

Figure 4 is an enlarged top plan view of a sugaring device used in my invention.

Figure 5 is a longitudinal sectional view taken on the line 5—5 of Figure 4.

Figure 6 is a transverse sectional view taken on the line 6—6 of Figure 5.

In the drawings like numerals refer to like parts.

In carrying out my invention I place chewing gum dough in a mixing and conditioning machine 20 from which the gum, after proper conditioning, is extruded in a circular strand 21. The strand passes longitudinally towards and is moved progressively forward in a sugar agitator 22 from which the strand discharges in a serpentine or snake formation 23 resting upon a tilted platform 24, desirably assuming a right angle position in plan view, with respect to the mixing and sugaring devices.

The strand then passes progressively through re-shaping rollers 25 from which it is moved while still warm, to a cutting device 26 where the strand is cut into individual pieces which are wrapped, the wrap ends being finally twisted in a wrapping machine similar to that shown in British Patent No. 293,907.

I prefer to employ a mixing and extruding machine of the type shown at 20, having a hopper 27 into which a mass of cooked gum dough is placed for proper conditioning. The strand extruded by the mixing machine is thoroughly heated, as by the nozzle 56.

After the strand of gum 21 has passed out through a heated nozzle die 56 of the mixing machine, the strand will curve downwardly some distance to assume a position in the sugaring agitator 22 similar to that shown in Figure 5 in which the agitator 22 is shown in considerable detail.

The strand 21 as extruded from the mixing machine extends downwardly at 72 and upwardly at 73, at which point the strand rests upon the forward curved end 74 of a curved conveyor platform 75, slotted at 76. The forward end of the platform 75 is apertured at 77 for the reception of a cam 78 secured to and actuated by a shaft 79 which extends transversely to the conveyor platform 75 to a position outside the casing 80 of the agitator 22, where a pulley 81 is secured to the shaft 79. The pulley 81 is driven by a belt 82 from a pulley 83 on a shaft 84 connected to a motor 85 mounted upon a platform 86 adjacent the agitator.

At the rear end of the agitator 22 the platform 75 is connected to the side walls 87 of the agitator frame by coiled springs 88 and 89, through brackets 90 and 91. One end of each of the coiled springs is fastened to the platform at 92 and the other end is fastened to each of the brackets.

The interior of the bottom of the agitator is curved at 93 and is shown as of similar shape to the platform, with a space 94 between the bottom 93 and the platform. At the rear of the agitator interior, a resilient pad 95 is inserted between the agitator container and an end plate 96, to which container the pad 95 is preferably fastened.

The agitator is provided with a front wall 97 which prevents the escape of sugar from the interior of the agitator.

Towards the front end and inside of the agitator and along the side walls 98 I place resilient pads 99 which extend vertically from the bottom of the agitator to the top thereof. These pads are preferably fastened to the side walls of the agitator. If the platform should tend to move laterally due to the spring suspension of the platform, the pads will act as a buffer to hold the platform in a longitudinal position. The pads are preferably made of felt.

Other resilient pads 100 are positioned adjacent the stop 97 to aid in keeping the platform longitudinally in line.

A brush 101 is fastened in a support 102 and is attached to the agitator side walls with the bristles of the brush extending outwardly to engage the strand of chewing gum as it is passed through the sugaring machine.

The platform is shown in the form of a trough with sides 103 which help to guide the strand as it travels through the sugaring machine.

Sugar is placed in the agitator interior to rest on the bottom 104 of the agitator below and above the platform 75.

The platform is agitated by the action of the cam 78 on the cam shaft 79 through the pulleys and belt, which are motor driven. As the cam turns it will move the platform up and down, at the same time the cam will tend to move the strand forwardly. The movement forward will be aided somewhat by the pushing forward of the strand when the gum is extruded from the mixer.

The movement of the platform either up and down or forwardly agitates the sugar 105 in the container to cause the sugar to form in effect a cloud, which will dust about the strand on the platform and through the slots in the platform, to cause the particles of sugar to adhere to the gum strand which is susceptible to adhesion of such particles as the gum is still warm from its heating for the extrusion operation.

The brush 101 removes the surplus sugar from the strand as the strand is passed from the agitator onto the platform 24. The platform 24 has upwardly turned edges 24' surrounding the entire platform excepting at the entrance 106 and the exit 107, thereby preventing the strand from falling off the platform.

After the strand has moved from the agitator onto the platform it assumes a snake or serpentine formation thereon and this snake formation allows for differences in timing of the different devices used in my invention and accommodates for the travel of the strand as it is passed from one device to another. The curving of the strand also allows for its cooling sufficiently for re-shaping, cutting and wrapping as hereinafter described. On leaving the platform 24, the strand passes between guides 242 at the exit of the platform.

The strand now passes through laterally adjustable guide members 108, then through a set of horizontal rollers 109, through vertically disposed sets of rollers 110, and on through other sets of horizontal rollers 111 and 112. The horizontal rollers 109, 111 and 112 and the vertical rollers 110 are spaced along a table 113 which supports the strand from one set of rollers to the next, until the strand reaches the knife 26.

The motor-driven sprocket 114 drives the sprocket 115 by the chain 115'. The driven sprocket 115 is on the shaft 116, which carries a bevel gear 117, engaging a bevel gear 118 on the same shaft as one of the vertical rollers 110. The other vertical roller 110 is driven by the gears 119 and 120 connecting the vertical rollers 110.

On the shaft 116 a second sprocket 121 drives one of the horizontal rollers 109 by a chain 122 connecting to a sprocket 123 on the same shaft as one of the horizontal rollers 109. The horizontal rollers 109 are interconnected by gears 124 and 125. To adjust the size of the strand, the sets of rollers 109, 110, 111 and 112 are changed.

The guide members 108 may be adjusted by loosening the screws 126.

After the strand is cut by the rotating knife 26, the individual pieces are moved forwardly by a pusher 127 to come in contact with a continuous strip supply of paper 128 from over a roll 129 hung from springs 129' positioned in front of a slot 130 in a recessed drum 131 on a drum shaft 132 which is controlled by a Geneva wheel (not shown).

After the individual piece of gum is brought to a position within the paper 128 in one of the recesses of the drum, a pair of scissors 133 are operated to cut an individual wrap of paper 134 from the paper strip.

The drum is rotated to cause the gum that has been partially covered with an individual wrap to be moved to a position 180° away from the point of insertion within the drum where twisters 135 engage the ends of the wrap to twist the wrap to hold the gum in the wrap and thereby complete a permanent wrapping.

Having thus described my invention, what I claim as new and desire to secure by Letters Patent is:

1. A sugaring device for a strand of heated chewing gum comprising a casing adapted to hold sugar, a swinging platform within the casing, open at the bottom to permit passage of sugar and lifting and lowering mechanism for the platform whereby the sugar is intermittently forced in and allowed to escape from the platform and a dust of sugar is formed about the strand.

2. In a sugar agitator for sugaring and conditioning a strand of chewing gum, a casing having an interior, curved in longitudinal vertical plane and adapted to receive powdered sugar, a platform having a transversely serrated bottom, a resilient support for one end of the platform permitting that end to swing about the center and to move forward and back and cam means for lifting the platform and drawing it forward with return at a lower level whereby the strand is progressed through a cloud of sugar.

3. An agitating device for applying sugar to a strand of heated gum as it is being extruded, a casing adapted to contain the sugar to be applied, a movable platform having openings in the bottom located within the casing and adapted to afford support to the strand, in combination with means for agitating the platform, moving it forward positively at the front end in line with the direction of extrusion and intermediately shifting the platform backward against the direction of movement of the extruding strand and resilient support for the rear of the platform providing for modification of the agitating movement of the platform by the resilience of the rear support.

4. A sugaring device for a strand of heated chewing gum, comprising a casing adapted to hold sugar, a movable platform within the casing open at the bottom to allow passage of sugar and means for vibrating the platform.

5. In a sugaring device for a strand of heated chewing gum, a casing adapted to hold sugar, a platform adapted to lie partly within the sugar in the casing, vertically slitted in transverse planes and means for lifting and lowering the platform and moving it at an angle to the slits.

6. In mechanism for handling and sweetening a travelling strand of chewing gum, means for shaking the travelling strand transverse to the strand and a holder for sugar within which the strand is shaken.

JACOB WARREN BOWMAN.